(12) United States Patent
Runk (10) Patent No.: US 6,926,359 B2
(45) Date of Patent: Aug. 9, 2005

(54) CHILD SEAT COVER

(75) Inventor: Kelly L. Runk, Pequea, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 10/798,895

(22) Filed: Mar. 12, 2004

(65) Prior Publication Data

US 2004/0239163 A1 Dec. 2, 2004

Related U.S. Application Data (60) Provisional application No. 60/457,306, filed on Mar. 26, 2003.

(51) Int. Cl.[7] .............................. A47C 7/38; A47C 31/11
(52) U.S. Cl. ............... 297/219.12; 297/229; 297/230.1; 297/230.13; 297/230.14; 297/397
(58) Field of Search ........................ 297/219.12, 229, 297/230.1, 230.11, 230.13, 230.14, 250.1, 397

(56) References Cited

U.S. PATENT DOCUMENTS

| | | | |
|---|---|---|---|
| 4,883,701 A | 11/1989 | Rankin et al. ...... | 297/219.12 X |
| 4,885,200 A | 12/1989 | Perdelwitz, Jr. et al. .................. | 297/219.12 X |
| 4,891,454 A | 1/1990 | Perdelwitz, Jr. et al. .................. | 297/219.12 X |
| 5,586,351 A | * 12/1996 | Ive ..................... | 297/219.12 X |
| 5,735,576 A | 4/1998 | Pepys et al. ......... | 297/219.12 X |
| 5,829,829 A | 11/1998 | Celestina-Krevh ..... | 297/219.12 |
| 5,842,739 A | * 12/1998 | Noble .................... | 297/219.12 |
| 5,979,981 A | * 11/1999 | Dunne et al. .......... | 297/219.12 |
| 6,036,263 A | * 3/2000 | Gold ..................... | 297/219.12 |
| 6,139,100 A | 10/2000 | Baskin-Lockman et al. .................. | 297/219.12 X |
| 6,454,352 B1 | 9/2002 | Konovalov et al. .... | 297/219.12 |
| 6,752,457 B2 * | 6/2004 | Gold et al. ............ | 297/219.12 |
| 2004/0017100 A1 | 1/2004 | Gold et al. ............ | 297/219.12 |

FOREIGN PATENT DOCUMENTS

JP          2001-63415          3/2001

* cited by examiner

Primary Examiner—Rodney B. White
(74) Attorney, Agent, or Firm—Foley & Lardner LLP (57) ABSTRACT

A cover for a child seat in the form of a pad with slots through the pad that facilitate simple removal and reinstallation of the cover. Some of the slots accommodate the seat safety harness and merge with side slots that are held closed by mating separable fastening elements. The side slots extend at least partially along the junction between the backrest portion and the side bolster portions of the pad. A pair of back slots extend from respective strap anchoring locations in the backrest region to respective side slots. A release slot may be included at each side of the pad, extending from the respective side slot to the adjacent outer side edge of the pad—this being especially useful with three-point harness seats. A five-point harness version has a pair of lap strap slots through the pad to accommodate the lap straps of the harness. The lap straps slots extend outwardly to the adjacent side slots. Adding release slots as described gives this latter cover universal application.

14 Claims, 11 Drawing Sheets

CHILD SEAT COVER

CROSS-REFERENCE TO RELATED PATENT APPLICATIONS

This application claims the benefit of U.S. provisional application No. 60/457,306, filed Mar. 26, 2003, which is incorporated by reference herein in its entirety.

BACKGROUND

The present invention relates to seating for children. In particular, the invention relates to coverings for child seats that have safety harnesses.

Child seats, such as car seats, swing seats, high chair seats, stroller seats, and infant carriers, commonly comprise a molded plastic shell and a releasable safety harness that is anchored to the shell at least three points. Seat comfort is enhanced by a soft cover that overlies at least the occupant-facing surfaces of the seat shell. Such covers are provided with openings through which the harness straps and hardware can pass. For example, for a three-point harness, the cover has an opening in the crotch region of the seat bottom portion, where a buckle normally is located, and at least one pair of openings in the backrest portion that accommodate shoulder straps. For a five-point harness, the cover has an additional pair of openings to accommodate the lap straps, which either can be joined directly to the shoulder straps or can be distinct from the shoulder straps, depending on the particular harness type. These additional openings can extend through a bight portion of the cover, where the seat bottom portion and the backrest portion meet, or through the seat bottom portion itself.

When the soft cover for the seat becomes soiled, which can occur quite often, the cover must be removed for laundering. The cover removal process usually is quite involved because the harness must be disassembled and unthreaded from the cover and the seat shell. Cover reinstallation requires the cumbersome reverse process of rethreading the harness through the various openings, and readjusting the harness. This invention simplifies the process of cover removal and reinstallation.

SUMMARY OF THE INVENTION

An aspect of the invention is directed to a cover for a child seat having a harness including at least a pair of shoulder straps each anchored in the backrest of the seat, and a buckle assembly anchored to the seat bottom and adapted for releasable coupling to the shoulder straps. The cover comprises a pad sized and contoured to substantially conform to the seat. The pad includes a bottom portion, a backrest portion joined to the bottom portion, and two side bolster portions joined to the backrest portion and the bottom portion. A crotch slot through the bottom portion of the pad accommodates the buckle assembly. A pair of side slots through the pad extend at least partially along the junctions between the backrest portion and the side bolster portions. A pair of back slots through the backrest portion of the pad accommodate the respective shoulder straps and extend outwardly to the respective adjacent side slots. Mating separable fastening elements at the margins of each of the side slots releasably close the side slots.

For seats having a plurality of vertically spaced backrest locations for anchoring the upper portions of the shoulder straps, the backrest portion of the pad comprises a like plurality of pairs of back slots to accommodate the respective shoulder straps. These back slots extend outwardly to the adjacent side slots. The side slots extend to a height at or near the height of the uppermost pair of back slots.

The cover may further include a release slot through the pad at each side thereof, each release slot having mating separable fastening elements at its margins and extending from the respective side slot to the adjacent outer side edge of the pad. Each release slot can meet the bottom of the respective side slot. This arrangement is particularly useful on most seats that have a three-point harness.

For a seat having a five-point harness, the cover further can include a pair of lap strap slots to accommodate the two respective lap straps of the harness. Each of the lap strap slots extends outwardly to the adjacent side slot. Release slots such as those described above optionally may be provided to make this a universal cover, useful for three-point and five-point harness seats.

BRIEF DESCRIPTION OF THE DRAWINGS

The above and other features, aspects and advantages of the invention will become apparent from the following detailed description and the accompany exemplary embodiments shown in the drawing figures, in which.

It is to be understood that the invention is not limited in its application to the details of construction and the arrangement of components described below and illustrated in the drawing figures. Those skilled in the art will recognize that various modifications can be made without departing from the scope of the invention, which is defined by the appended claims.

DETAILED DESCRIPTION

Figure 1:
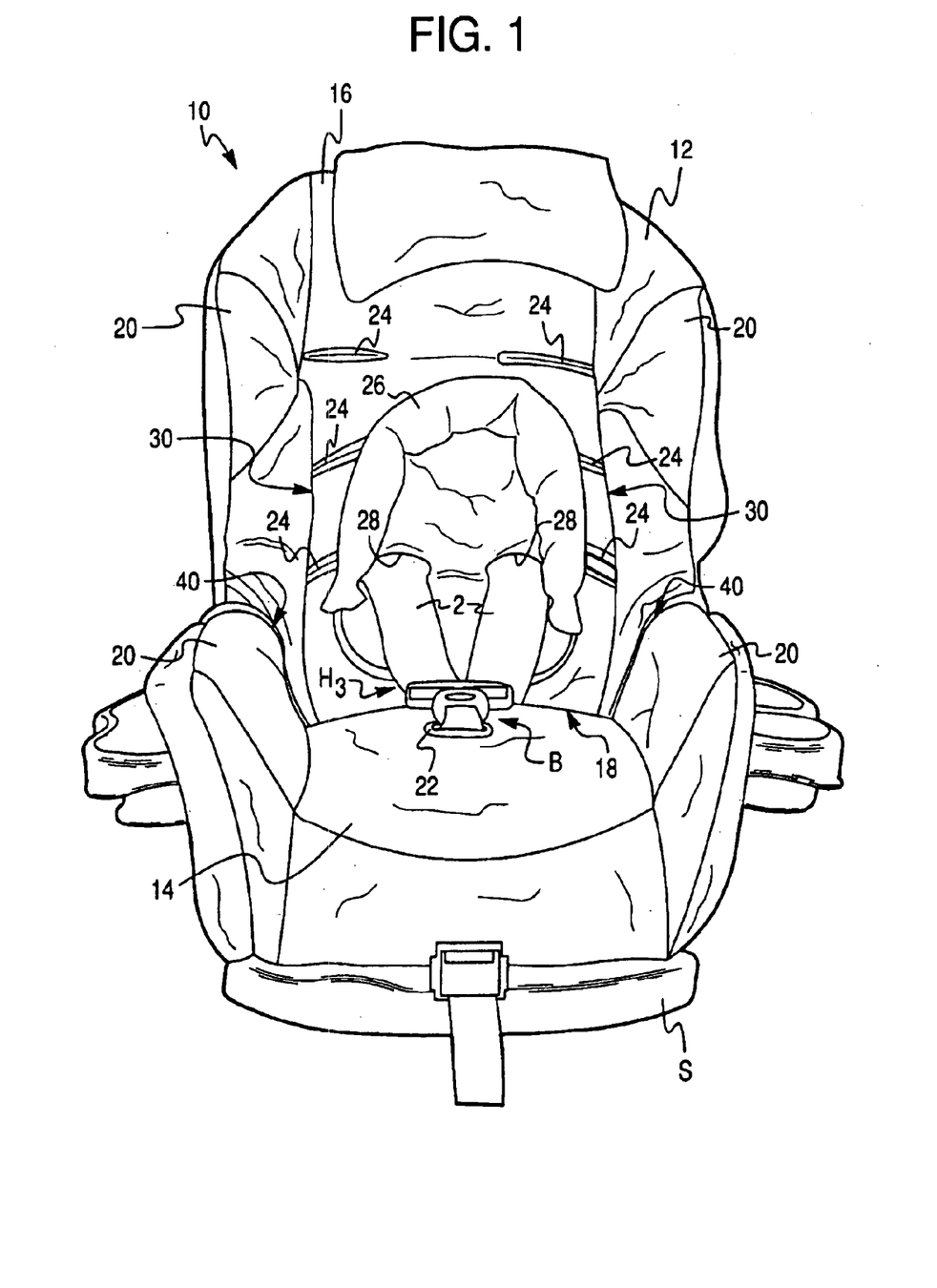
FIG. 1 is a front elevational view of a first embodiment of the child seat cover according to the invention, installed on a child seat having a three-point harness and an accessory head support.
Figure 2:
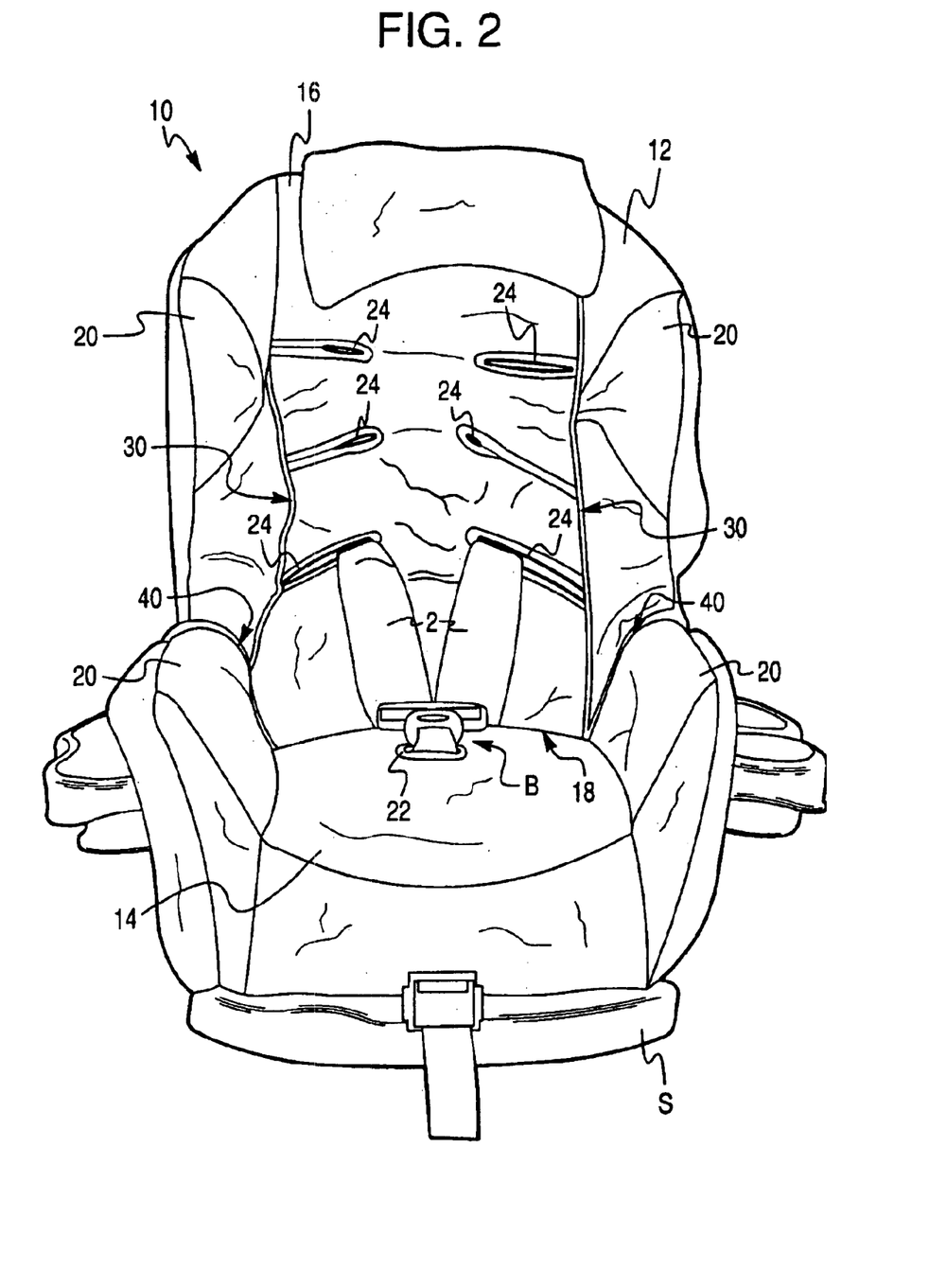
FIG. 2 is a front elevational view of the child seat cover of FIG. 1 without the accessory head support.
Figure 7:
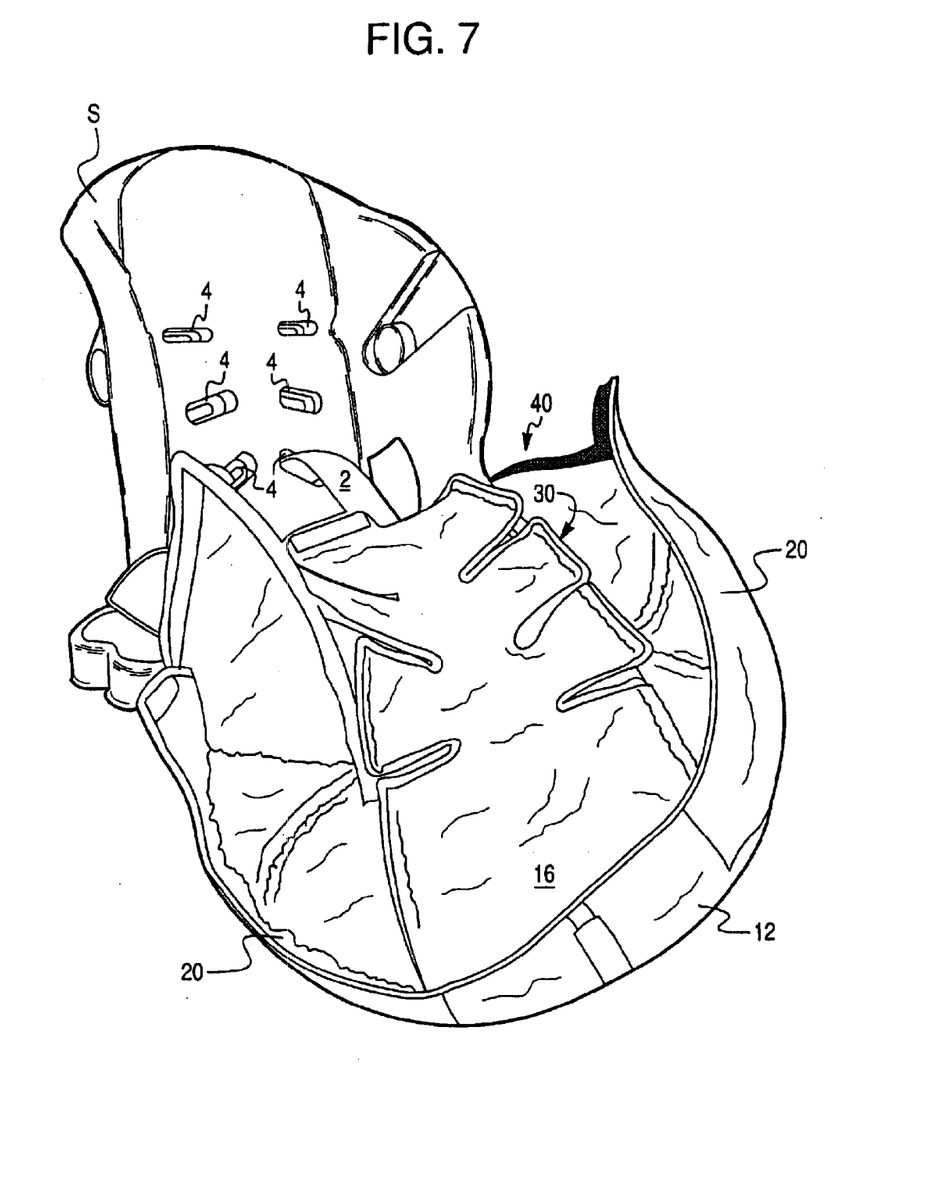
FIG. 7 is a perspective view of the child seat cover of FIG. 1, shown partially removed from the child seat.
Figure 8:
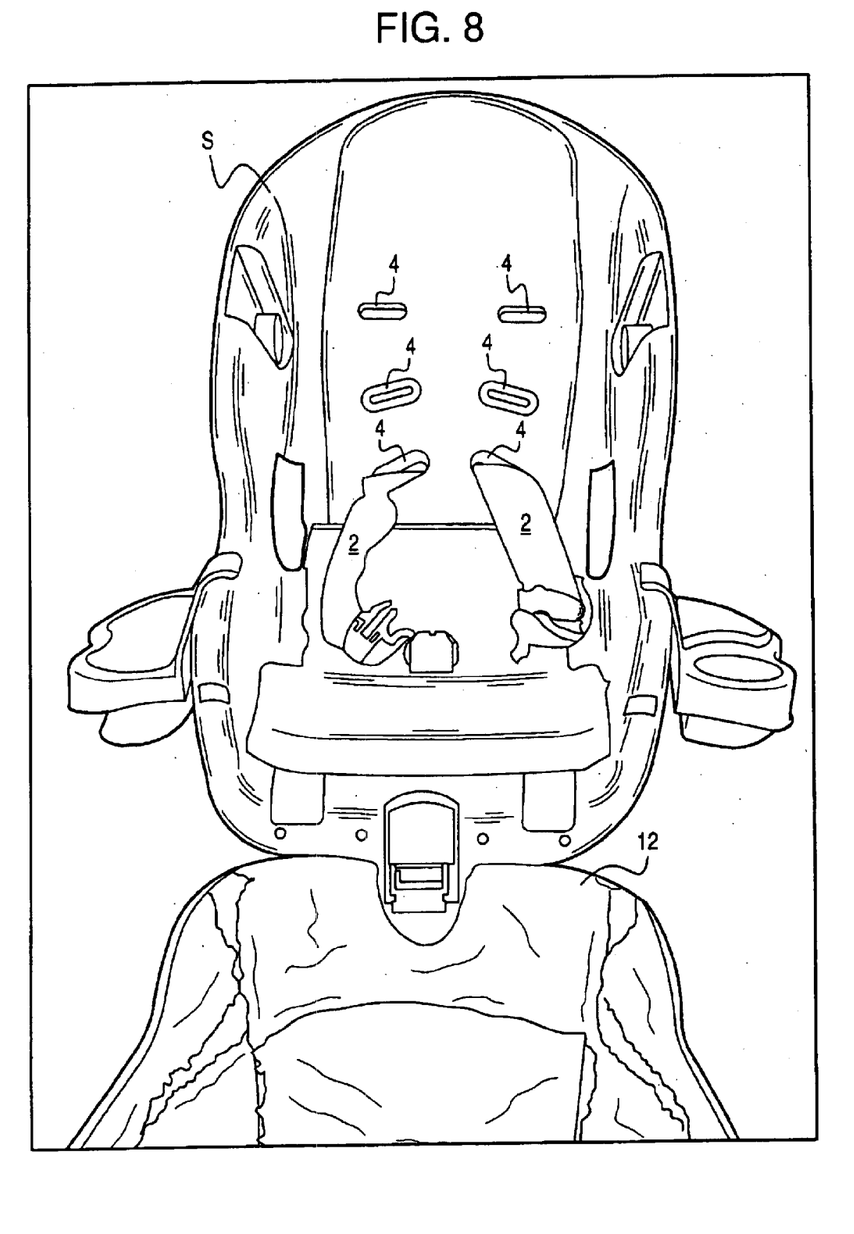
FIG. 8 is a front elevational view of the child seat cover of FIG. 1, shown completely removed from the child seat.

Referring to FIGS. 1 and 2, a child car seat S is shown having a three-point harness $H_3$ and a cover 10 according to the invention. Harness $H_3$ may comprise a pair of shoulder straps 2 and a buckle B. The shoulder straps 2 are anchored to the back of the molded seat shell at one of a plurality of vertically spaced pairs of anchoring positions, for example, through slots 4 in the seat shell (see FIGS. 7 and 8). Shoulder straps 2 can be releasably joined to the buckle assembly B, which is located in the crotch region of the bottom of the seat. FIG. 8 shows a buckle assembly of this type in the released condition. Thus, there are three anchoring points for the harness H₃: at the top of each shoulder strap 2 and in the crotch region. The cover 10 is designed to fit a seat of this type.

Cover 10 comprises a pad 12 made of any material or assembly of materials commonly used for seat covers, such as fabric or fabric-covered padded vinyl. Pad 12 has a bottom portion 14, a backrest portion 16 joined to bottom portion 14 at a bight portion 18, and two side bolster portions 20 joined to backrest portion 16 and bottom portion 14.

Bottom portion 14 has a crotch slot 22 in general alignment with the seat anchor location for the buckle assembly B. The buckle assembly B can include a buckle B that is tethered to the seat shell by a short strap, as shown in the figures, and the crotch slot 22 is large enough to allow the buckle to pass through it. Other seat designs may have a tang that is recessed in the bottom portion and releasably receives a buckle that is connected to the shoulder straps. Regardless of the buckle arrangement, the crotch slot 22 is large enough to accommodate any portion of any type of buckle assembly so that the pad 12 can be removed from the seat with the lower portion of the buckle assembly still anchored to the seat shell. Alternative pad embodiments can include two crotch slots.

Backrest portion 16 has vertically spaced pairs of back slots 24 that are in general height-alignment with the anchoring slots 4 in the seat shell. This arrangement of back slots 24 allows the shoulder straps 2 to pass through the backrest portion 16 regardless of the position of the shoulder straps. Infants or very young children often require additional lateral head support, and this can be provided by a removable padded head support 26 having positioning notches 28 that are partially open to the bottom edge of the head support 26 so as to removably engage shoulder straps 2.

Figure 3:
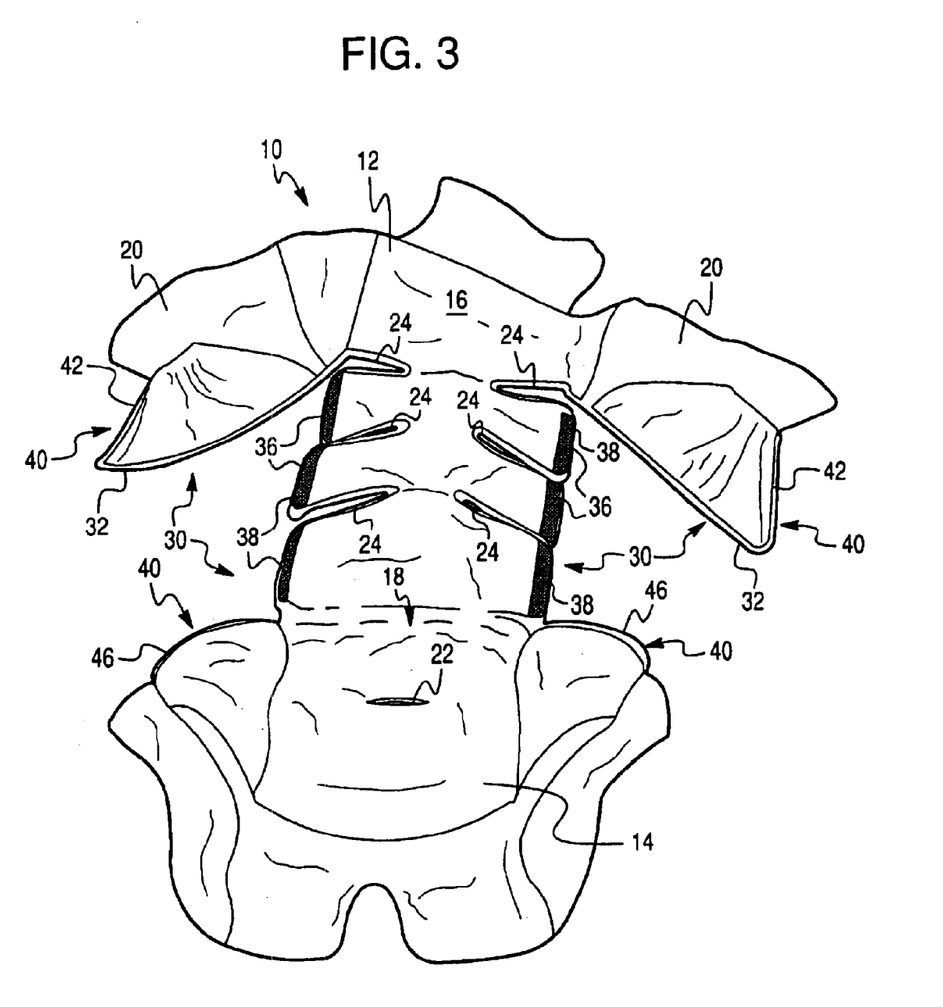
FIG. 3 is a perspective view of the child seat cover of FIG. 1 removed from the child seat.
Figure 5:
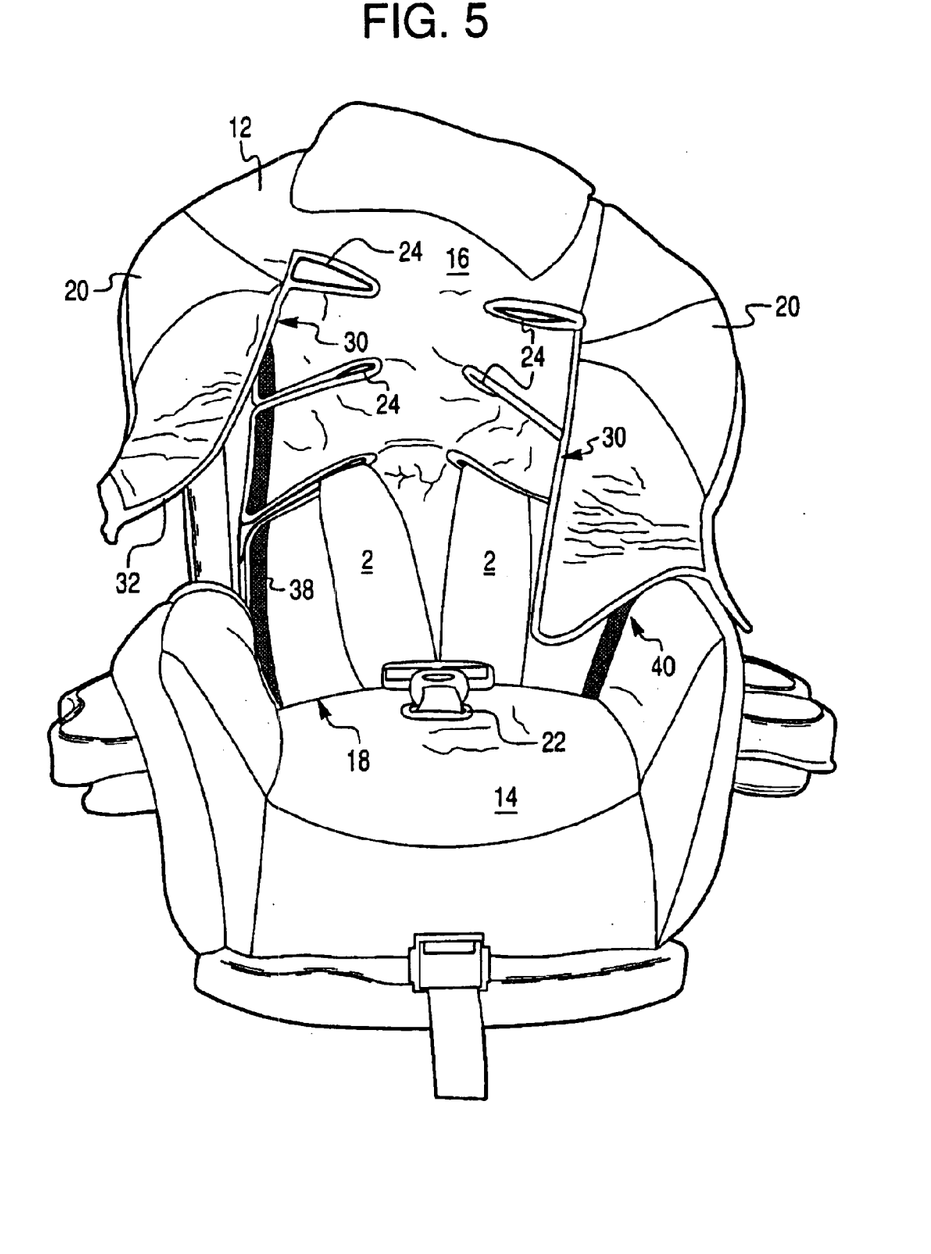
FIG. 5 is a front elevational view similar to FIG. 2, showing the child seat cover in a partially disassembled state.
Figure 6:
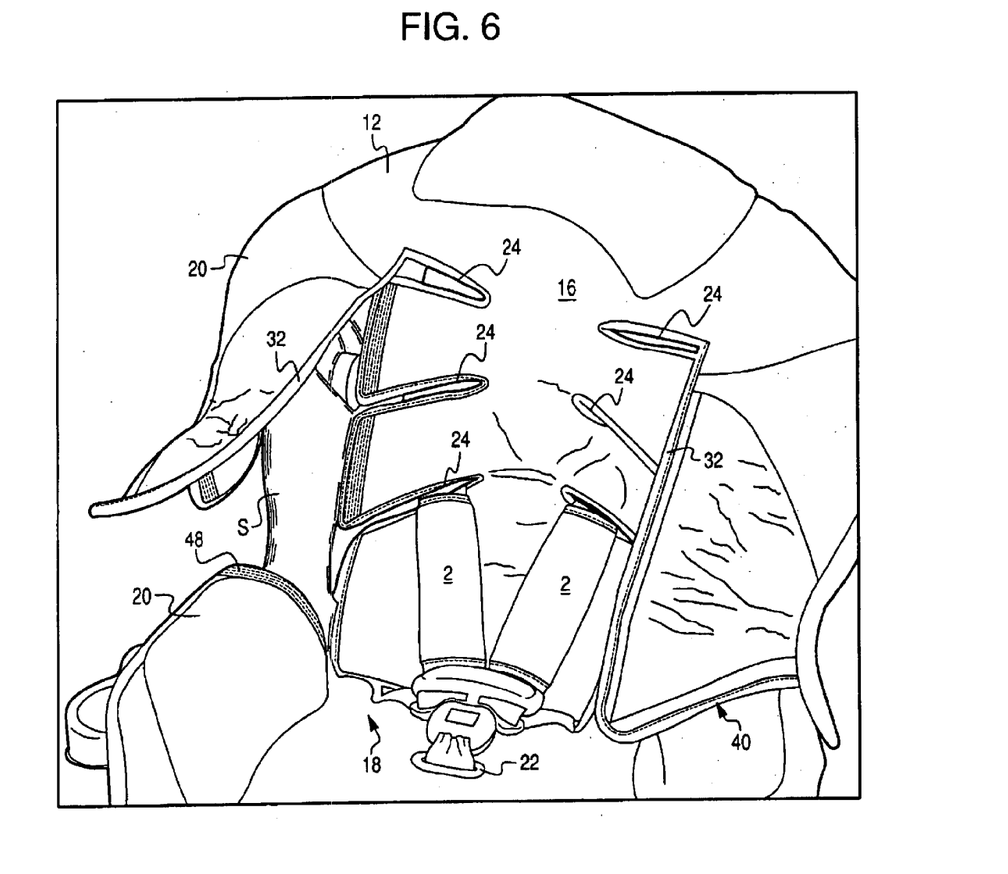
FIG. 6 is a perspective detail view of the child seat cover of FIG. 1, shown in a partially disassembled state.

Pad 12 has two closable side slots 30 that extend at least partially along the junction between the backrest portion 16 and the side bolster portions 20. For example, the side slots 30 can extend substantially along the junction between the backrest portion 16 and the respective side bolster portions 20 to a height below the upper edge of the pad 12. Side slots 30 are best seen in FIG. 3, which shows pad 12 removed from the seat with side slots 30 open. The upper ends of the side slots 30 can be at about the same height as the uppermost pair of back slots 24. Back slots 24 extend outwardly to side slots 30 so that, when side slots 30 are open, backrest portion 16 of the pad 12 can be lifted away from the seat shell and disengaged from shoulder straps 2 while the shoulder straps 2 are still anchored to the seat shell. This is best seen in FIGS. 5–7.

Figure 4:
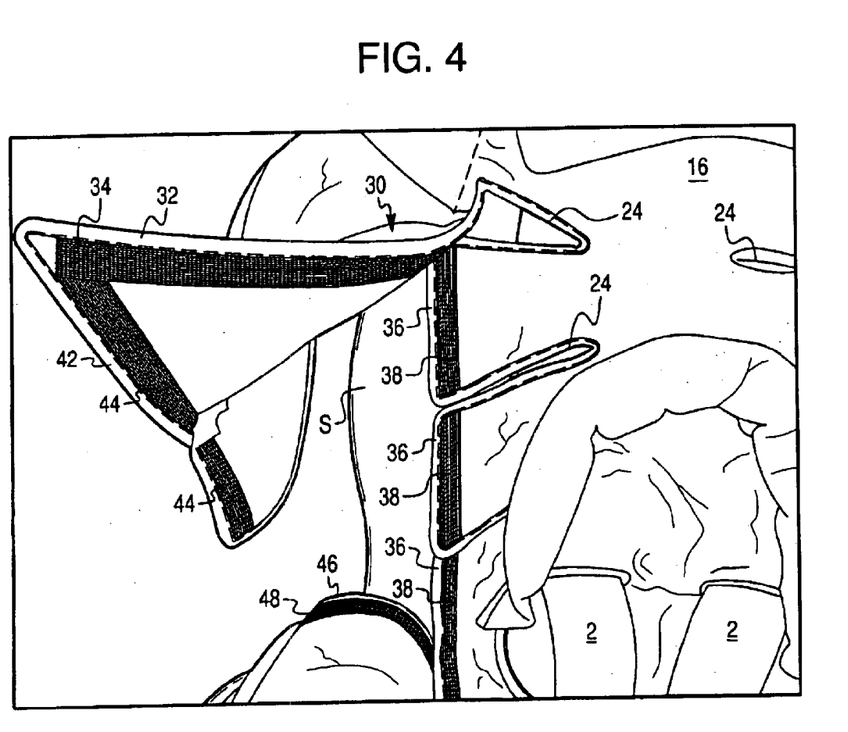
FIG. 4 is a front elevational detail view of the child seat cover of FIG. 1, shown in a partially disassembled state.

The margins of side slots 30 preferably are provided with separable mating fastening elements, for example, strips of VELCRO® hook and loop fasteners, which keep side slots 30 (and the inner ends of back slots 24) closed, but allow for easy opening for pad removal. In the illustrated embodiment, the outer margins 32 of side slots 30 have sewn-on strips of VELCRO® hook elements 34, while the inner margins 36 have sewn-on strips of mating VELCRO® pile elements 38. FIG. 4 shows these strips in detail. Any other suitable type of fastening system may be used to secure the margins of side slots 30, such as discrete, spaced VELCRO® "dots," spaced metal or plastic snaps, metal or plastic zippers, etc.

With some three-point harnesses, the buckle assembly does not permit ready separation of the shoulder straps from one another. In order to make the pad 12 more easily removable from seats with harnesses of that type, the pad 12 is provided with a pair of release slots 40, each extending from a side slot 30 to the adjacent outer side edge of the pad. Release slots 40 are best seen in FIGS. 3 and 4. The outer margins 42 of release slots 40 have sewn-on strips of VELCRO® hook elements 44, while the inner margins 46 have sewn-on strips of mating VELCRO® pile elements 48. As with side slots 30, any other suitable type of fastening system may be used to releasably close release slots 40.

The above-described arrangement allows the pad 12 to be removed from the seat quickly and easily, without having to dismantle the harness and unthread it from the seat shell. The pad removal process is generally illustrated in FIGS. 5–8. The shoulder straps 2 normally would first be released from the buckle assembly B, although this is not shown in FIGS. 5 and 6. Referring to FIGS. 5 and 6, the VELCRO® strips along the side slots 30 are opened, which opens the ends of back slots 24. The top of pad 12 is then pulled forwardly, away from the seat shell (see FIG. 7), and the open back slots 24 allow the backrest portion 16 of pad 12 to be pulled clear of the shoulder straps 2. This can be accomplished even if the shoulder straps 2 remain coupled together because the entire upper portion of the pad 12 (backrest portion 16 and associated side bolster portions 20) can be pulled out between the shoulder straps 2. If the buckle arrangement is of the type that allows the shoulder straps to be separated easily (see, for example, the arrangement shown in FIG. 8), pad removal is made even simpler.

Figure 9:
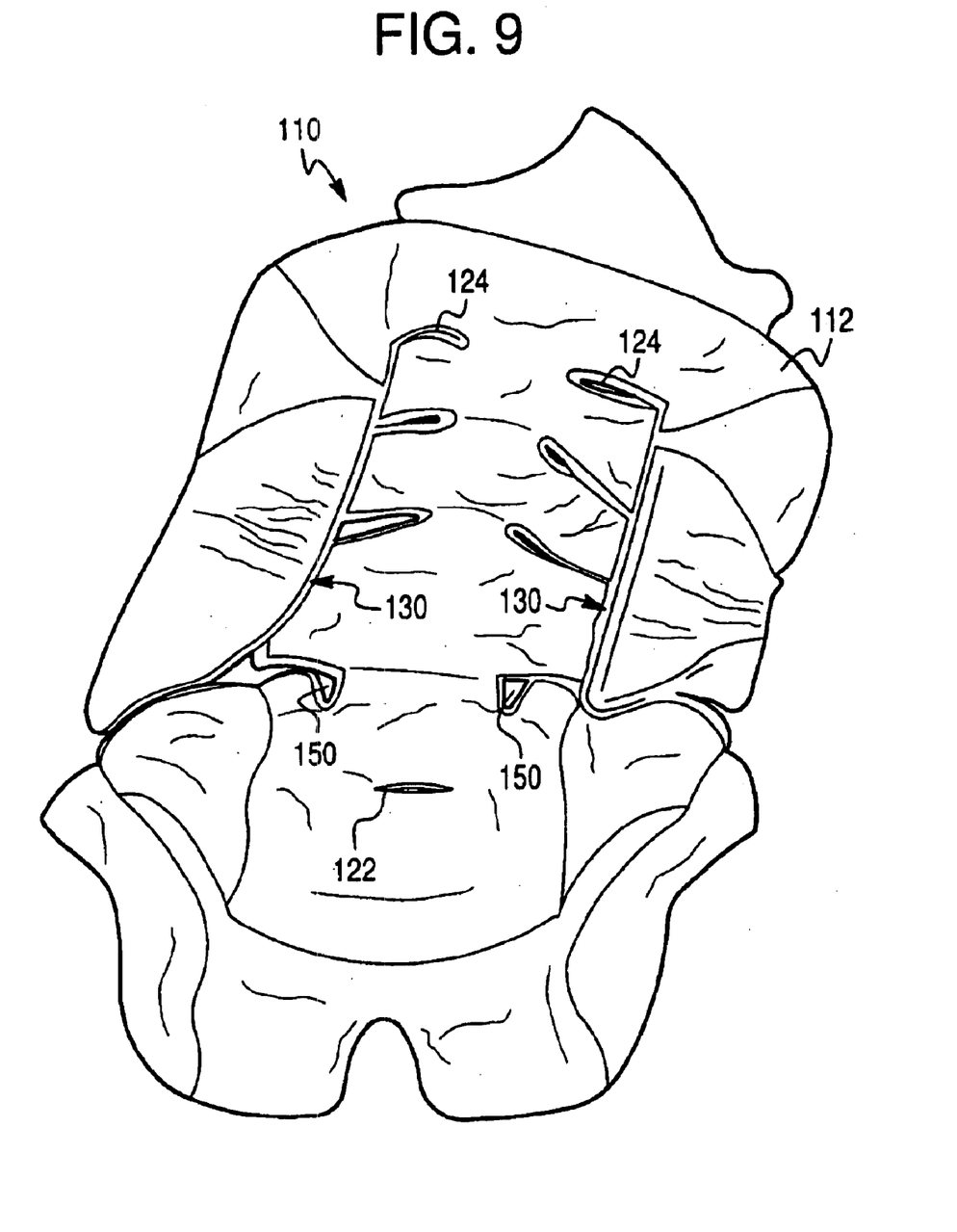
FIG. 9 is a perspective view of a second embodiment of the child seat cover according to the invention, for use with a child seat having a five-point harness.
Figure 10:
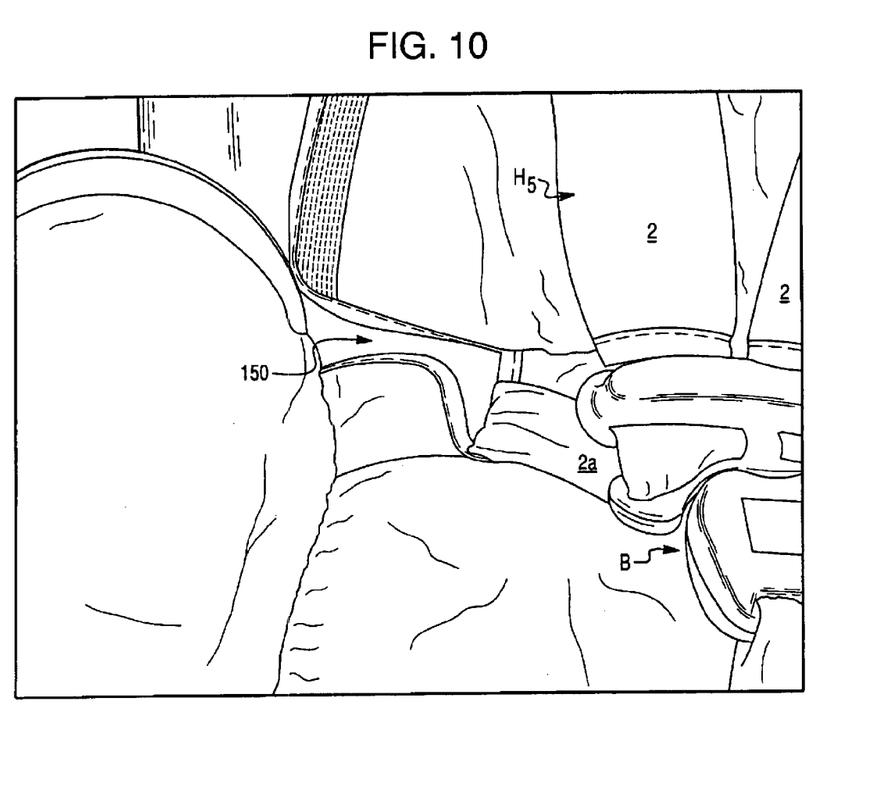
FIG. 10 is a perspective detail view of the child seat cover of FIG. 9.

FIGS. 9 and 10 depict a cover 110 according to the invention for use with a seat having a five-point harness H₅, which normally allows for ready separation of the shoulder straps from each other. A five-point harness is anchored to the seat at five locations: at the top of each shoulder strap, in the crotch region, and at the ends of two lap straps 2a. This cover 110 comprises a pad 112 that is similar to pad 12, with a crotch slot 122, side slots 130 and back slots 124. However, this pad 112 has no release slots 40, which are found in pad 12. Rather, pad 112 is provided with a pair of lap strap slots 150. Lap strap slots 150 accommodate lap straps 2a. The lap straps 2a are anchored to the bight portion of the seat, where the seat bottom meets the backrest. Lap strap slots 150 extend outwardly to side slots 130 so that, when side slots 130 are open, pad 112 can easily be lifted away from the seat and disengaged from the harness straps while they are still anchored to the seat shell. In the illustrated example, lap straps 2a are actually the lower portions of shoulder straps 2. In other five-point harnesses the lap straps may be discrete straps that are joined to the shoulder straps at the buckle assembly. Thus the term "lap straps" as used in this application means the straps of the harness that engage the lap of the seat occupant, whether they be portions of the shoulder straps or discrete strap elements that are joined to the shoulder straps.

Figure 11:
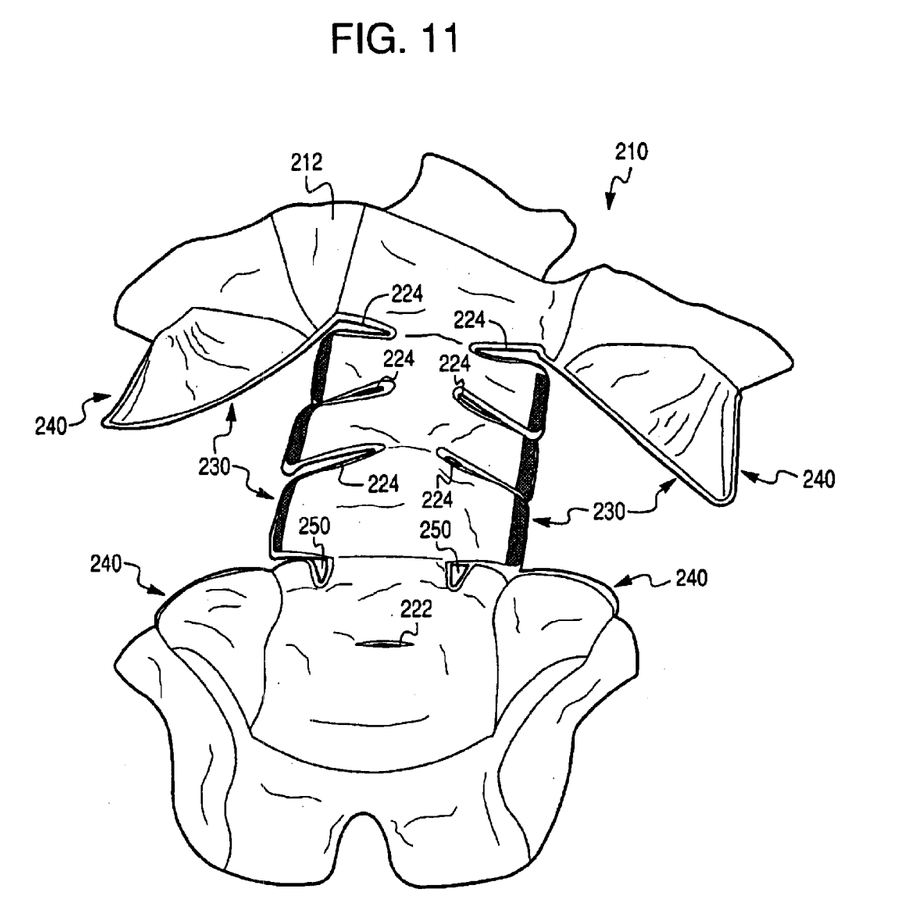
FIG. 11 is a perspective view of a third embodiment of the child seat cover according to the invention, for use with a child seat having either a three-point or a five-point harness.

FIG. 11 depicts a "universal" seat cover 210 that incorporates features of both of the previously described embodiments and is usable with seats having either a three-point or a five-point harness. Specifically, cover 210 comprises a pad 212 that is very similar to pad 112 of FIG. 9, with a crotch slot 222, side slots 230, back slots 224 and lap strap slots 250. Pad 210 also has release slots 240 like those of pad 12 (FIG. 1), with VELCRO® fasteners. Release slots 240 may (but need not) be opened for removal of cover 210 from a seat with a five-point harness. For a seat having a three-point harness with shoulder straps that are not readily separated from each other, release slots 240 will need to be opened for cover removal.

Seat covers according to the invention are not limited in their application to child car seats as illustrated and described above. It should be understood that these covers are usable on any other type of child seat that has a releasable safety harness, such as swing seats, high chair seats, stroller seats, and infant carriers. It will be apparent that various modifications can be made to any of the above-described aspects and embodiments of the invention without departing from the scope of the invention as defined by the following claims.

I claim:

1. A cover for a child seat, the seat having a front surface, a harness including at least a pair of shoulder straps, each anchored in the backrest of the seat, and a buckle assembly anchored to the seat bottom and adapted for releasable coupling to the shoulder straps, the cover comprising:
   a pad sized and contoured to substantially conform to the front surface of the seat and including a bottom portion to substantially cover the seat bottom of the seat, a backrest portion joined to the bottom portion to substantially cover the backrest of the seat, and two side bolster portions, each of the side bolster portions including a first portion joined to the backrest portion of the pad and a second portion joined to the bottom portion of the pad, the first and second portions being separable from each other;
   a crotch slot through the bottom portion of the pad to accommodate the buckle assembly;
   a pair of side slots through the pad, each side slot extending at least partially along the junction between the backrest portion and a respective side bolster portion;
   a pair of back slots through the backrest portion of the pad to accommodate the respective shoulder straps, each of the back slots extending outwardly to the adjacent side slot; and
   mating separable fastening elements at the margins of each of the side slots to releasably close the side slots.

2. A cover for a child seat according to claim 1, for a seat having a corresponding plurality of vertically spaced pairs of backrest locations for adjustably anchoring the shoulder straps, wherein the backrest portion of the pad comprises a plurality of pairs of back slots to accommodate the respective shoulder straps, the back slots extending outwardly to the respective adjacent side slots, and wherein the side slots extend to a height at or near the height of the uppermost pair of back slots.

3. A cover for a child seat according to claim 1, wherein the mating separable fastening elements comprise mating hook and loop fasteners.

4. A cover for a child seat according to claim 1, further comprising a release slot through the pad at each side thereof, each release slot having mating separable fastening elements at its margins and extending from the respective side slot to an adjacent outer side edge of the pad.

5. A cover for a child seat according to claim 4, wherein each release slot meets a bottom of the respective side slot.

6. A cover for a child seat according to claim 5, wherein the mating separable fastening elements comprise mating hook and loop fasteners.

7. A cover for a child seat according to claim 4, for a seat having a plurality of vertically spaced pairs of backrest locations for adjustably anchoring the shoulder straps, wherein the backrest portion of the pad comprises a like plurality of pairs of back slots to accommodate the respective shoulder straps, the back slots extending outwardly to the respective adjacent side slots, and wherein the side slots extend to a height at or near the height of the uppermost pair of back slots.

8. A cover for a child seat according to claim 7, wherein each release slot meets a bottom of the respective side slot.

9. A cover for a child seat according to claim 8, wherein the mating separable fastening elements comprise mating hook and loop fasteners.

10. A cover for a child seat, the seat having a front surface, a five-point harness with two lap straps anchored in the seat bight portion of the seat and two shoulder straps anchored in the backrest of the seat, and a buckle assembly anchored to the seat bottom and adapted for releasable coupling to the lap straps and the shoulder straps, the cover comprising:
    a pad sized and contoured to substantially conform to the front surface of the seat and including a bottom portion, a backrest portion joined to the bottom portion, and two side bolster portions joined to the backrest portion and the bottom portion:
    a crotch slot through the bottom portion of the pad to accommodate the buckle assembly;
    a pair of side slots through the pad, each side slot extending at least partially along the junction between the backrest portion and a respective side bolster portion;
    a pair of back slots through the backrest portion of the pad to accommodate the respective shoulder strays, each of the back slots extending outwardly to the adjacent side slot;
    mating separable fastening elements at the margins of each of the side slots to releasably close the side slots; and
    a pair of lap strap slots through the pad to accommodate the respective lap straps, each of the lap strap slots extending outwardly to the adjacent side slot.

11. A cover for a child seat according to claim 10, wherein the mating separable fastening elements comprise mating hook and loop fasteners.

12. A cover for a child seat according to claim 10, for a seat having a plurality of vertically spaced pairs of backrest locations for adjustably anchoring the shoulder straps, wherein the backrest portion of the pad comprises a corresponding plurality of pairs of back slots to accommodate the respective shoulder straps, the back slots extending outwardly to the respective adjacent side slots, and wherein the side slots extend to a height at or near the height of the uppermost pair of back slots.

13. A cover for a child seat according to claim 10, for a seat having either a five-point harness or a three-point harness, further comprising a release slot through the pad at each side thereof, each release slot having mating separable fastening elements at its margins and extending from the respective side slot to an adjacent outer side edge of the pad.

14. A cover for a child seat, the seat having a front surface, a harness including at least a pair of shoulder straps, each anchored in the backrest of the seat, and a buckle assembly anchored to the seat bottom and adapted for releasable coupling to the shoulder straps, the cover comprising:
    a one-piece pad sized and contoured to substantially conform to the front surface of the seat and including a bottom portion to substantially cover the seat bottom of the seat, a backrest portion joined to the bottom portion to substantially cover the backrest of the seat, and two side bolster portions joined to the backrest portion and the bottom portion;
    a crotch slot through the bottom portion of the pad to accommodate the buckle assembly;
    a pair of side slots through the pad, each side slot extending at least partially along the junction between the backrest portion and a respective side bolster portion;
    a pair of back slots through the backrest portion of the pad to accommodate the respective shoulder straps, each of the back slots extending outwardly to the adjacent side slot; and
    mating separable fastening elements at the margins of each of the side slots to releasably close the side slots.

* * * * *